United States Patent [19]

Wilen

[11] Patent Number: 5,214,869
[45] Date of Patent: Jun. 1, 1993

[54] PROGRAMABLE ORGANIZER AND METHOD OF MAKING SAME

[76] Inventor: Richard Wilen, 8 Roxbury Ct., Oakdale, N.Y. 11769

[21] Appl. No.: 556,864

[22] Filed: Jul. 20, 1990

Related U.S. Application Data

[60] Continuation of Ser. No. 180,610, Apr. 5, 1988, abandoned, which is a division of Ser. No. 78,092, Jul. 27, 1987, abandoned.

[51] Int. Cl.⁵ .............................................. G09D 3/02
[52] U.S. Cl. .................................................. 40/122; 283/2
[58] Field of Search ......................... 40/119, 122, 124.2, 40/124.4, 159, 323; 281/31; 283/2

[56] References Cited

U.S. PATENT DOCUMENTS

| | | | |
|---|---|---|---|
| 1,320,683 | 11/1919 | Goodhue | 40/537 |
| 2,305,443 | 12/1942 | Pinto | 40/537 |
| 2,775,050 | 12/1956 | Ellsworth | 40/159 |
| 3,207,421 | 9/1965 | Hunger et al. | 40/122 X |
| 3,850,083 | 11/1974 | Falcon | 156/227 |
| 4,173,837 | 11/1979 | Kiejzik | 40/159 |
| 4,301,962 | 11/1981 | Monckton et al. | 40/124.4 X |
| 4,824,503 | 4/1989 | Wilen | 156/219 |

FOREIGN PATENT DOCUMENTS 1603 of 1867 United Kingdom .................. 40/537

Primary Examiner—Kenneth J. Dorner
Assistant Examiner—Brian K. Green
Attorney, Agent, or Firm—Stephen E. Feldman

[57] ABSTRACT

A disposable two-ply programmable rack or organizer is described along with a preferred in-line paper supply handling or manufacturing system. A preferred system, using a roll of paper for a supply source is shown and described along with several alternate systems. Paper of the supply may be pre-printed or blank so that the two-ply programmable rack or organizer may be manufactured in printed form or made in blank form.

1 Claim, 2 Drawing Sheets

PROGRAMABLE ORGANIZER AND METHOD OF MAKING SAME

This application is a continuation of application Ser. No. 180,610, filed Apr. 5, 1988, now abandoned, which is a division of application Ser. No. 078,092, filed Jul. 27, 1987, now abandoned.

BACKGROUND OF THE INVENTION

The present invention relates to programmable devices, such as organizers and methods of making programmable devices. In particular the present invention relates to disposable or inexpensive programmable devices made from relatively inexpensive materials and methods of making such programmable devices.

In the days prior to television broadcasting, radio was a large part of family entertainment, especially in the home. There were relatively few radio broadcasting stations in any one particular area and, for the most part, most radio stations shut down during the early hours of the morning. Only a few radio stations broadcast twenty-four (24) hours a day and most of those that did broadcast around the clock played pre-recorded music over the air. Another characteristic of radio was that most radio, which was not pre-recorded music, was broadcast live.

Programs for radio were published in the newspaper, usually on a daily basis. Programs were based on time of presentation and the radio station airing the broadcast. It was normal for an individual to look at a radio program, seek out the particular time on the program schedule and look to see what was listed as being presented over the various radio stations at that time. Essentially, radio programs were simple and easy to read. There was very little, if any program duplication or replay.

With the introduction of television there were also only a relatively few television broadcasting stations during the infancy of television for any particular area. Television programs, also published in the newspaper, were also published daily and were based on time of presentation, primarily and the television stations, commonly referred to as "channels" listed under the time, with the identification of the presentation being broadcast.

Although radio broadcasting was expanded from audio modulation broadcasting to frequency modulation broadcasting and radio broadcasting was networked among the major broadcasting stations in large population areas, radio was not cablized and carried to individual homes by a cable network. In addition, radio really never competed with motion pictures because radio lacked the visual concept found in motion pictures.

Thus, radio programming remained relatively uncomplex and programs published daily in local papers for local broadcasting stations remain relatively simple and easy to read.

Television, hereinafter referred to as TV, unlike radio, became greatly expanded. Networks of cable were installed in large population areas and in other areas, and TV presentations from all over the country could be seen on "Cable TV". Cable TV made a relatively large number of TV stations or channels available for viewing all over the U.S. In addition many TV broadcasting stations broadcast around the clock and many TV presentations were pre-recorded and/or rebroadcast. Unlike radio, which is limited to audio capability, TV has both audio and visual capability and thus can broadcast motion pictures and all manner of sporting events. The potential of TV being far greater than radio, although radio has retained its place in society.

With a large number of TV channels available for viewing substantially all over the U.S. and with around the clock TV broadcasting/ TV stations have found it necessary to repeat presentations.

These factors have made TV programs, that is, the schedule of TV presentation, a rather complicated program and a difficult program to read. TV presentations are sometimes repeated or rebroadcast the same day and on different days. The complexity of the TV program is due in part by a failure to change the basis on which the program is set forth, that is, the basis of time.

It has been found convenient to present TV programs on the basis of the name or identity of the presentation rather than the basis of time of presentation. This has been done by using TV program stamps. Each stamp identifies a TV presentation on one side of the stamp and sets up the schedule of airing by channel, time, and date or day, on the other side. The stamps may come in sheets of cut-out or tear-out stamps and the stamps may be placed in a programmable organizer, set up in calendar form so that an individual may easily generate his own personal TV program.

My co-pending patent application entitled Programming Device, now U.S. Pat. No. 4,815,225, issued Mar. 28, 1989 teaches the use of such TV presentation identifying stamps in a TV program.

Although the programming device of my said co-pending patent application provides a programmable personal TV program device, the structure of the mirror calendar and transparent flip page does not lend itself to being a disposable device. It is very functional but requires a complex manufacturing process to make and assemble the device.

SUMMARY OF THE PRESENT INVENTION

The present invention advances the art with respect to programmable organizers particularly useful in generating a personal TV program where the program is based on the name of the presentations in the schedule. The present invention provides a simple, effective, disposable organizer as a product produced from a common supply of paper by a novel system. The disposable programmable organizer is inexpensive and simple to make. The organizer may be made in blank so that the person creating his own personal TV program may lable the months, day and date, thus making the organizer reusable, yet disposable, The organizer may be pre-printed before assembly, printed during assembly or after assembly, as desired.

The paper supply maybe a roll of paper where a running sheet is processed into a two-ply sheet organizer. The roll of paper may be pre-printed, printed during the manufacturing process or made in blank. Paper from the supply is fed into the apparatus of the system and a first portion of the running sheet is processed in the first stage of the manufacturing system. The first portion of the sheet advances to the second stage for processing simultaneously, with a second portion of the running sheet entering the first stage of the system and being processed therein. In uniform advancement the first portion of the running sheet enters the third stage, the second portion of the running sheet enters the second stage and a third portion of the running sheet enters the first stage of the manufacturing process, for processing. Thus, in a running, in-line manufacturing system, a plurality of sequential portions of the running sheet are being processed in various stage of the manufacturing process.

In its simplest form, the manufacturing process includes cutting a pattern of slits in a portion of the paper, laying down a pattern of adhesive material stripes on the paper relative to the slits in the paper, folding the paper over itself to form a two-ply sheet with the adhesive stripes on the inside of the two-ply sheet holding the sheet together. The slits cut in the paper are positioned so as to be offset from corresponding parallel lines of adhesive stripes. The stripes form pockets in the two-ply sheet and the slits form openings for the pockets.

The slits may be cut in one part of a portion of a paper sheet and the pattern of adhesive stripes may be layed down in a second corresponding portion of the paper sheet. The two portions may then be combined into a two-ply sheet.

Alternatively a pattern of slits may be cut in one portion of a paper sheet and a pattern of adhesive stripes may be layed down on the same portion of the paper, the stripes being offset from the slits cut in the paper. Another corresponding portion of the sheet may then be combined with the first portion to form a two-ply sheet defining the organizer. If the paper supply is in the form of a roll of paper the two or corresponding portions of the paper sheet may be folded and combined or may be cut, longitudinally and combined.

The adhesive material used may be any adhesive material such as glue, paste, cement or any other adhesive or bonding material capable of bonding and/or holding two sheets of paper, or other material used, together.

If the paper supply is in the form of pre-cut sheets in a stack, the sheet may be fed into the first manufacturing stage and a pattern of slits may be cut in one portion of the sheet. A pattern of adhesive stripes may be layed down on another portion of the same sheet and the sheet may be either folded over itself or cut in half and the one half may be combined with the other half to form a two-ply sheet. Alternatively the pattern of slits may be cut in one half or portion of the sheet and the pattern of adhesive stripes may be layed down on the same half or portion of the sheet with the adhesive stripes offset from the slits cut in the sheet. The sheet may then be combined, by folding the sheet over itself or by cutting the sheet essentially in half and combining the two halfs for forming a two-ply sheet.

Although in the preferred system a pattern of slits is cut into the sheet followed by the laying down of a pattern of adhesive or glue stripes on the sheet it will be obvious that the manufacturing stages may be reversed. That is, a pattern of adhesive stripes may be layed down on the sheet followed by cutting a pattern of slits in the sheet.

The product produced from a paper supply is a disposable two-ply organizer that is inexpensive to make and is made on an in-line production system. The product is made from a common material, which may be a relatively light weight paper, for example 25 lb directory stock. When the supply is a roll of paper, the roll may be many thousands of feet long, the width being as desired. From such roll of paper a large number of disposable, programmable organizers or racks may be made.

When using pre-cut sheets of paper, the pre-cut sheets may be stacked and when using one sheet to make one organizer, sheets of paper are differentiated or separated from the stack and fed into the system one at a time and processed by the system into a disposable, programmable organizer. Although the preferred system for making programmable organizer uses a roll supply, pre-cut sheets in a stack of sheets is an alternative.

When using pre-cut sheets of paper for supply, the supply may be a single stack of sheets of pre-determined size and shape or two stacks of sheets, each sheet of the stack of sheets being essentive one half the size, i.e. surface area, of the sheets in the single stack. The dual stack supply avoids the need of cutting the sheet or folding the sheet to make a two-ply sheet.

The pattern of adhesive stripes layed down on the surface of the paper may be defined as a plurality of rectangular adhesive stripes. When another sheet is layed over the pattern of adhesive stripes a two-ply sheet is formed, held together with the adhesive stripes, the adhesive stripes being on the inside surface of the two-ply sheet. Rectangular pockets are formed, defined by the rectangular adhesive stripes. The slits cut in the surface of the sheet are located so as to be essentially parallel with the long or longitudinal measurement of the pocket and are positioned off set from the adhesive stripes so as to be located on or in the pocket, as opposed to being on the adhesive stripe. The slit in the pocket then forms a mouth or opening in the pocket so that articles, such as data storing slips or stamps may be removably stored in the pockets, as desired.

DETAILED DESCRIPTION OF THE INVENTION

Figure 1:
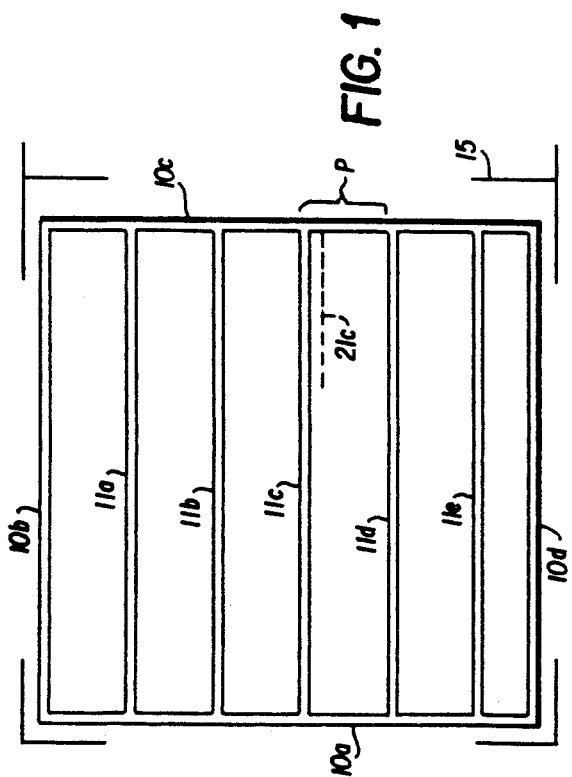
FIG. 1 is a diagramatic representation of a pattern of adhesive material layed down on a sheet.

FIG. 1 represents a preferred pattern of stripes of adhesive or glue layed down on a sheet or portion of a sheet. Peripheral stripes 10a, 10b, 10c and 10d are used to secure the perimeter of the two-ply sheet when a second the adhesive pattern is layed down. The longitudinal stripes 11a, 11b, 11c, 11d and 11e serve to form pockets in the two-ply sheet, the bottom pocket formed by stripes 11e and 10d. The adhesive stripes pattern is layed down on a sheet represented as 15.

Figure 2:
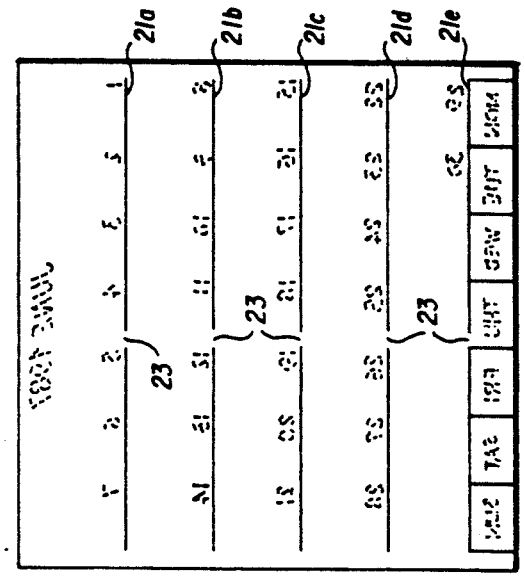
FIG. 2 is a diagramatic representation of a pattern of slits cut in a sheet with printing on the reverse side of the sheet.

Sheet 15 is preferably sufficiently large so as to permit the pattern of slits, such as represented in FIG. 2 to be cut in the surface and have the sheet folded over itself or cut into two sheets and combined so as to form a two-ply sheet with the adhesive stripes pattern on the inside surface of the two-ply sheet, when combined.

Alternatively the adhesive pattern of stripes may be layed down on one sheet and the pattern of stripes may be cut in the surface of another sheet of substantially the same size and shape and the two sheets combined to form a two-ply sheet.

Another alternative would be having the adhesive stripes pattern layed down on one sheet or on one part or half of a particular sheet and cutting a pattern of slits in the same, that is said one sheet, the slits being offset from corresponding stripes of adhesive. The two-ply sheet is then formed by combining a second sheet over the processed sheet.

In FIG. 2 the slits 21a, 21b, 21c, 21d and 21e are represented as being interrupted at 23. This pattern of slits, that is, with the interruption adds a strength factor to the pockets, where the slits forms the opening in the pocket.

The broken line 21c in FIG. 1 represents the slit 21c in FIG. 2 and is used to illustrate the usable pocket P, for storing data.

On the reverse side of the sheet on which the slit pattern has been cut, printing is represented.

Figure 3A:
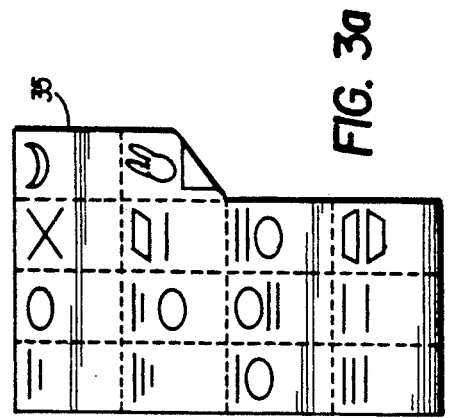
FIG. 3a represents a sheet of stamps.
Figure 3:
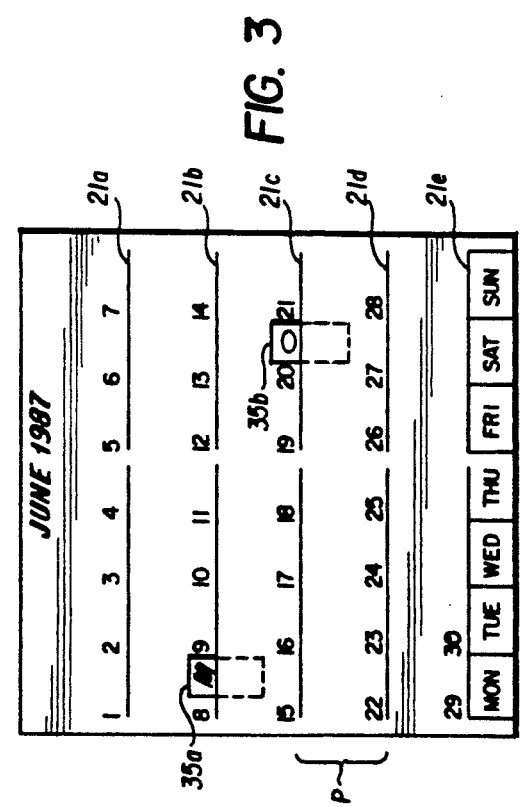
FIG. 3 is a pictorial representation of a two-ply programmable organizer assembled from the sheets represented in the proceeding drawings.

FIG. 3 represents the two-ply programmable organizer with the printing shown. The slits 21a through 21e define the mouth or openings in the pockets. When using five pockets, each longitudinal pocket may be representative of a week of a month calender, each pocket being subdivided into seven (7) positions representing the days of the week.

FIG. 3a illustrates a sheet of stamps 35. Each stamp may represent a different TV presentation. On the front, for example the presentation may be identified, by name and or some other data. On the back, for example, the schedule of airing may be set forth. Thus, as seen at 35a and 35b, stamps may be placed in the pocket representing a day and date and, a personal TV schedule or program may be set forth in the organizer.

Figure 4A:
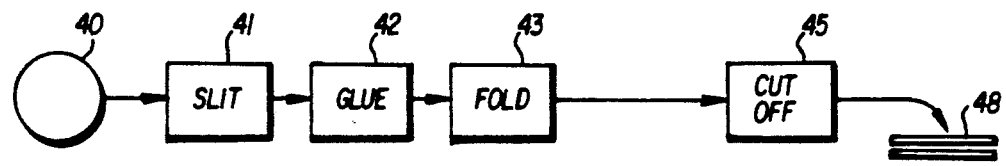
FIGS. 4a, 4b, 4c, 4d and 4e are block diagrams of in-line manufacturing systems for making and/or assembling a two-ply programmable organizer.
Figure 4B:
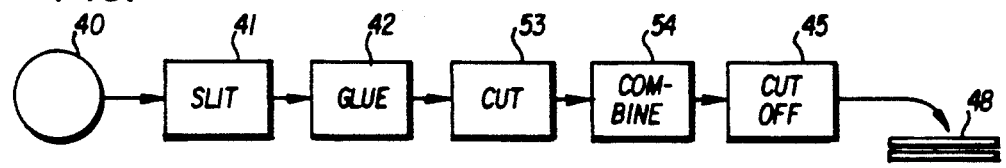
Figure 4B:
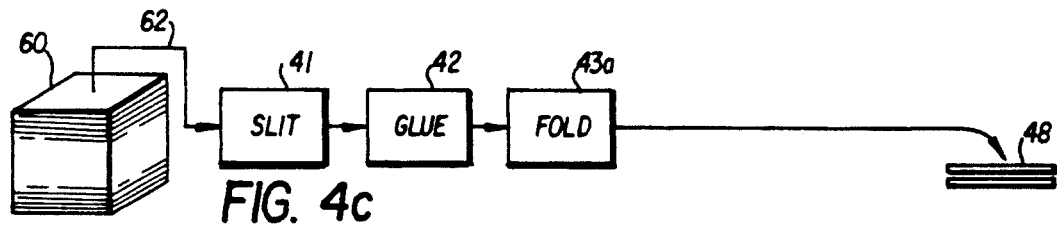
Figure 4C:
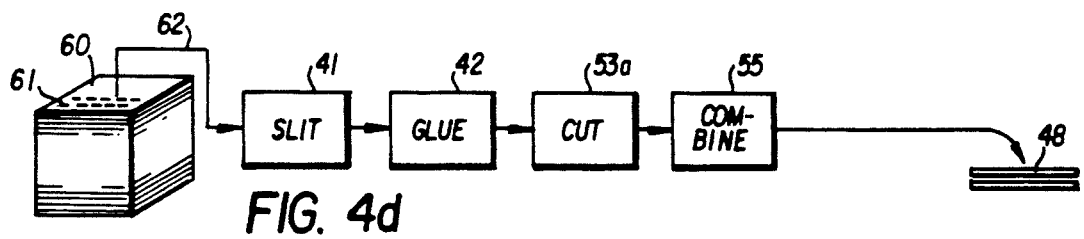
Figure 4D:
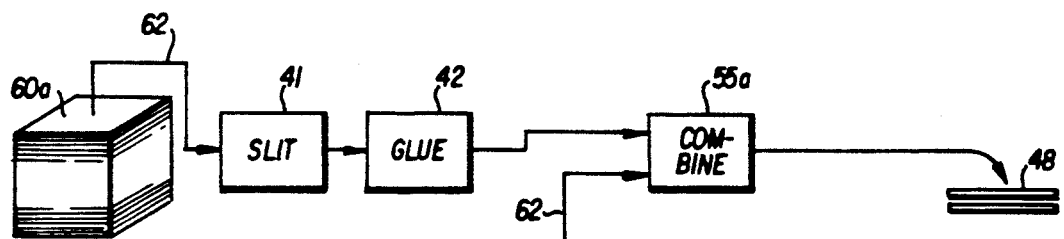
Figure 4E:
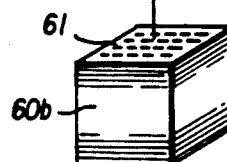

Referring now to FIGS. 4a, 4b, 4c, 4d and 4e, five (5) block diagrams of in-line systems for processing sheets of paper into disposable programmable racks or organizers are presented. The manufacturing or assembly systems represented by FIGS. 4a and 4b use a paper supply in roll form while the manufacturing or assembly systems represented by the block diagrams of FIGS. 4c and 4d represent supply stacks using single sheets while FIG. 4e represents that the paper supply may be in two separate stacks.

It should be understood that the systems represented process a paper supply into a two-ply disposable programmable organizer or rack. The systems may be integrated into other paper handling systems, such as printing systems and/or publishing systems, that is for making magazines, catalogs, and the like, if desired.

FIG. 4a represents the preferred system in which a paper supply roll 40 is fed into the first stage of processing. The paper supply forms a running sheet that passes through the system going from stage to stage progressively while portions of the running sheet are processed in turn by the paper handling system.

The running sheet enters the stage SLIT 41 which cuts a pattern of slits in the paper which are preferable similar to the pattern of slits represented in FIG. 2 or, alternatively, the slits may be cut, without interruption across the face of the sheet. Preferrable the sheet is first processed with the slit pattern since the adhesive layed down on the sheet forming the pattern of adhesive stripes is wet.

The next step 42 lays down a pattern of adhesive, for example glue, stripes, such as represented in FIG. 1. The portion of the running sheet is then folded over itself in the next stage 43 so that the pattern of adhesive stripes is on the inside of the folded sheet and the sheet is bound together into a two-ply sheet. Stage 45, CUT OFF may include a trimmer and disk cutter that cuts the running sheet to size and cuts the processed portion from the running sheet forming the programmable organizer 48.

The block diagram of FIG. 4b represents the supply roll 40 with the running sheet fed into the SLIT stage 41 and then into the GLUE stage 42. Next the running sheet enters the CUT stage 53 which may cut the running sheet lengthwise or cross-wise. Here the function is to cut the running sheet so as to form two sections or portions so that one section or portion can be layed over or combined with the other section or portion of the running sheet. In the stage COMBINE 54, the two-ply sheet is formed and the two-ply sheet is separated from the running sheet in the CUT OFF stage 45, which also may trim the product made, that is the organizer 48.

When using a cut sheet paper supply the system represented by FIG. 4c is preferred. The manufacturing or paper sheet handling systems represented in FIGS. 4c, 4d and removes, one at a time, sheets from the stack of sheets 60. The separated sheet is fed into the first stage SLIT 41 for cutting a pattern of slits in the surface of the sheet. The sheet is then moved to the next stage GLUE 42, while another sheet is differentiated from the stack 60 and fed into stage SLIT 41.

The stage FOLD 43a of FIG. 4c may differ somewhat from stage FOLD 43 in that in stage 43 of FIG. 4a, a running L sheet is folded while in FIG. 4c a single, already separated sheet is folded to make the two ply sheet organizer 48.

In FIG. 4d, the sheet differentiated from the stack is represented as pre-printed, such as at 61. The separated sheet is fed into the stage SLIT 41 and GLUE 42 and in this system enters a stage CUT 53a. The stage CUT a may be similar to stage CUT 53 of FIG. 4b, however the stage CUT 53a cuts a single sheet while stage CUT 53 cuts a running sheet and the two cutters may be different, if desired.

The stage COMBINE 55 may differ from the stage COMBINE because in stage 54 a running sheet is processed where in stage 55 separate sheets are processed. In stage COMBINE there may be included an aligning mechanism which aligns the sheets relative to each other before the sheets are combined into a two-ply sheet.

FIG. 4c represents that the sheets 60 are blank while FIG. 4d represents that the sheets 60 are pre-printed. This may be reversed if desired.

FIG. 4e represents that two stacks of sheets of paper maybe used. Sheets may be differentiated by 62 from the stack 60a and processed in the stages SLIT 41 and GLUE 42. The processed sheet may then be fed to the stage COMBINE 55a while a second sheet is differentiated from a stack 60b and also fed into stage 55a. In this system it is preferred that stage 55a include an aligning mechanism which orients and aligns the sheets from the supplies 60a and 60b with respect to the respective sheets. The combining of the sheets forms the two-ply organizer 48.

There has been described a preferred paper processing system for handling and processing a running sheet of paper from a roll supply for making a disposable two-ply organizer. Several alternate systems have also been represented and described. Also described is the disposable, two-ply organizer, which may be produced in blank or pre-printed. Although the preferred arrangement of stages has been described and alternate arrangements and changes have been suggested, other changes and modifications may be made, as well be apparent to those skilled in the art without departing from the spirit of the invention.

What is claimed is:

1. A two-ply programmable organizer for programming a series of events over a predetermined calendar period, said programmable organizer comprising:

(a) a first sheet of paper of a predetermined size and a predetermined shape and a second sheet of paper of said predetermined size and said predetermined shape, a pattern of lines of adhesive material on said first sheet, said first sheet and said second sheet bonded together in a two-ply sheet by said pattern of lines of adhesive material, said pattern of lines of adhesive material including a plurality of vertically spaced horizontal lines defining at least five vertically spaced horizontal spaces between said first sheet and said second sheet, each space of said five vertically spaced horizontal spaces defining a space for a horizontal pocket for providing five vertically spaced said horizontal pockets, each said horizontal pocket representing a calendar week, each said horizontal pocket apparently divided into a group of seven daily pockets by an indicia on said second sheet, each said group of seven daily pockets defining a week in days of a week;

(b) each said space including a slit means cut in said second sheet of said two-ply sheet inside each pair of vertically spaced horizontal lines defining said horizontal pocket for forming an opening in said second sheet for providing access to each said daily pocket in said group of seven daily pockets; and, (c) a data, in the form of consecutive numbers, assigned to sequentially positioned daily pockets, each number representing a numerical date of a month occurring on the day of the week to which such number is assigned for providing a predetermined calendar of pockets.

* * * * *